United States Patent [19]

Kagetsu et al.

[11] 4,207,295
[45] Jun. 10, 1980

[54] PROCESSING OF CHROMIUM ORE

[75] Inventors: Tadashi J. Kagetsu, Lewiston; William B. De Atley, Grand Island, both of N.Y.; Joseph S. Fox, Altamonte Springs, Fla.

[73] Assignee: Union Carbide Corporation, New York, N.Y.

[21] Appl. No.: 11,868

[22] Filed: Feb. 13, 1979

[51] Int. Cl.$^2$ .............................................. C01G 37/02
[52] U.S. Cl. ........................................ 423/55; 423/53; 423/61; 423/127
[58] Field of Search ................... 423/53, 55, 58, 61, 423/127

[56] References Cited

U.S. PATENT DOCUMENTS

| | | |
|---|---|---|
| 2,209,899 | 7/1930 | Darrin . |
| 2,350,980 | 6/1944 | Darrin .................................. 423/607 |
| 2,612,435 | 9/1952 | Perrin et al. .......................... 423/58 |
| 2,639,216 | 5/1953 | Banner .................................. 423/55 |
| 2,839,359 | 6/1958 | Dunning ............................... 423/53 |
| 3,095,266 | 6/1963 | Lauder et al. ........................ 423/61 |
| 3,137,541 | 6/1964 | Cooke ................................... 423/58 |
| 3,819,800 | 6/1974 | Shaffer et al. ........................ 423/58 |
| 3,899,568 | 8/1975 | Frick et al. ........................... 423/55 |
| 3,961,029 | 6/1976 | Senoo ................................... 423/55 |
| 4,029,734 | 6/1977 | Stauter et al. ......................... 423/54 |
| 4,139,460 | 2/1979 | Ghelli ................................... 423/55 |

OTHER PUBLICATIONS

Doener, "Bureau of Mines, RI 2999", Jun. 1930, 30 pp.

Primary Examiner—Herbert T. Carter
Attorney, Agent, or Firm—Fred Ian Nathanson

[57] ABSTRACT

Method for the recovery of chrome hydrate or high purity $Cr_2O_3$ from chromium ores by roasting the ore with $Na_2CO_3$ and CaO, water leaching the roasted mass, precipitating aluminum impurities from the leach liquor as $Al(OH)_3$ and contacting the leach liquor with sulfur and NaOH in order to reduce the chromium values in the leach liquor from valence 6 to 3 to provide a chrome hydrate precipitate. The chrome hydrate precipitate is acid repulped to provide a chrome hydrate from which sodium impurities have been removed. The chrome hydrate is dried and the resulting solids are calcined to provide a high purity $Cr_2O_3$.

24 Claims, 1 Drawing Figure

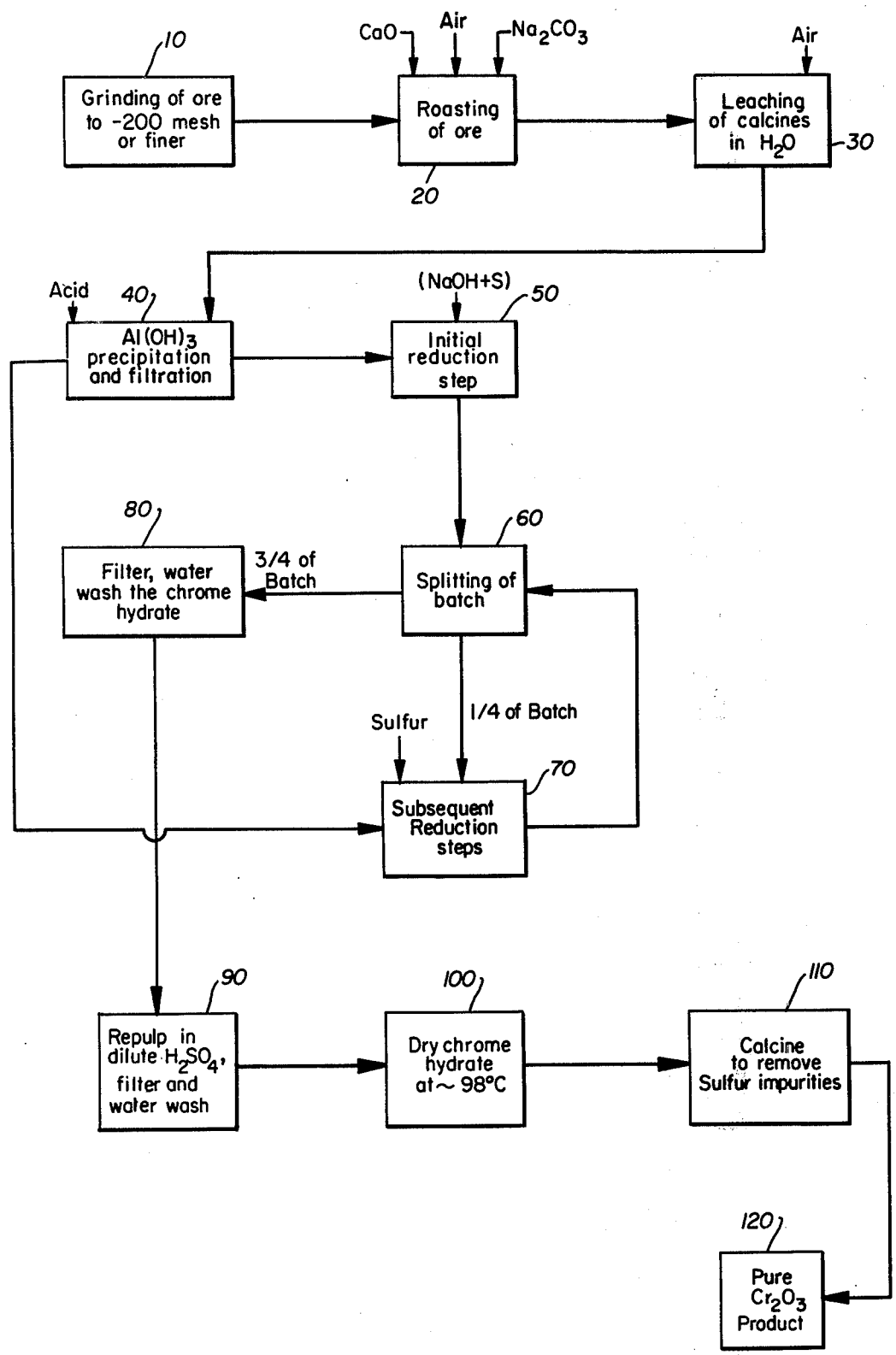

PROCESSING OF CHROMIUM ORE

The present invention is directed to the processing of chromium ores. More particularly the present invention is directed to the processing of chromium ores to obtain chrome hydrate or high purity $Cr_2O_3$.

Chromium compounds are essential to the oil and gas industries for corrosion control and the preparation of catalysts, the food and beverage industries in refrigeration brines and cleansing compounds, the transportation industries in diesel locomotives and automobiles, the iron and steel industries in stainless steel metal and chromium plate, the aircraft industry for anodizing aluminum and pickling magnesium, the copper industry for descaling brass and stripping copper, the electrical industry in mercury-arc rectifiers and dry cells, the pyrotechnical industries in matches and fireworks, and the photographic industry in lithography and engraving.

Chrom hydrate, i.e. $Cr(OH)_3.XH_2O$ wherein X commonly ranges from about 1 to 4, is used, for example, as a feed material for electrolytic chromium cells and as a starting material for chrome chemicals used in the tanning industry.

A major product is chromic oxide or $Cr_2O_3$ which is used in metallurgy and as well as a pigment.

In the production of chromium metal from chromic oxide, a relatively pure grade of $Cr_2O_3$ is desired. When the $Cr_2O_3$ material contains significant amounts of sodium as an impurity, sodium vaporizes in the vacuum carbon reduction process of producing pure chromium. This sodium cause fire hazards when it is deposited on the equipment walls and later exposed to the atmosphere. Sulfur can also be an undesirable impurity, for example, when chromium is used as an alloying ingredient.

Also, it is important in many applications that a $Cr_2O_3$ or chrome hydrate product be essentially free of aluminum impurities.

It is therefore an object of the present invention to provide a method for the production of chrome hydrate from chromium ores.

It is a further object of the present invention to provide a method for the production of high purity $Cr_2O_3$ from chromium ores.

Other objects will be apparent from the following description and claims taken in conjunction with the drawing which shows a flowsheet of a method in accordance with the present invention.

A method in accordance with the present invention comprises:

(i) roasting in a gaseous oxidizing environment a mixture of chromium ore with $Na_2CO_3$ and CaO at a temperature in the range of about 600° C. to 1100° C. for from about 0.5 to 6 hours, the amount of $Na_2CO_3$ being that which provides from about 1.4 to 4.2 pounds of $Na_2CO_3$ per pound of $Cr_2O_3$ in the ore and the amount of CaO being that which provides from about 0.6 to 1 pound of CaO per pound of $Cr_2O_3$ in the ore;

(ii) water leaching the roasted material obtained in step (i) at a temperature of from about 5° C. to the boiling point of water for from about 5 minutes to 5 hours;

(iii) adding an inorganic acid, e.g. HCl, $HNO_3$, $H_2SO_4$ to the leach liquor obtained in step (ii) which contains water soluble chromium salts to provide a pH of about 3 to 9.5 to cause precipitation of aluminum impurities;

(iv) contacting the liquor obtained in step (iii) with an aqueous slurry of NaOH and elemental sulfur at about the boiling point and additional elemental sulfur with the NaOH and elemental sulfur slurry and additional sulfur being in an amount sufficient to effect the reduction of the chromium values in the contacted liquor from a valence of 6 to 3 forming a chrome hydrate precipitate with said contacted liquor being maintained at about the boiling point during the reduction;

(v) recovering the chrome hydrate precipitate of step (iv) by filtration;

(vi) washing the recovered chrome hydrate of step (v) with water to remove entrained soluble impurities;

(vii) repulping the chrome hydrate of step (vi) in an $H_2SO_4$ solution at ambient temperature having a pH of about 2 to 5 followed by filtration to recover the chrome hydrate and water washing of the recovered chrome hydrate so that sodium and cation impurities are removed;

(viii) drying the chrome hydrate of step (vii) to provide a solid chromium-bearing material;

(ix) calcining the solid chromium-bearing material of step (viii) at a temperature of about 750° C. to 2200° C. so as to remove sulfur impurities and obtain $Cr_2O_3$.

Depending on the end product desired, certain of the hereinbefore described steps in the method for processing chromium ores may be omitted. A chrome hydrate product with aluminum impurities and entrained solubles removed may be obtained from chromium ores by the practice of steps (i) through (vi) of the method of the present invention. A chrome hydrate product essentially free of impurities except for sulfur may be obtained by the practice of steps (i) through (vii) of the method of the present invention.

Such chrome hydrate products would find application, for example, as feed material for electrolytic chromium cells.

In the practice of the present invention, and with reference to the drawing, a natural chromium ore, e.g. Transvaal ore (30 to 50% $Cr_2O_3$, 15 to 25% Fe, 2 to 10% $SiO_2$, 10 to 15% Al, less than 1% Na, 6-15% MgO, 0.2-0.6% Ca) or Nye ore (approximately 36.4% $Cr_2O_3$, 17.6% Fe, 13.8% $Al_2O_3$, balance minor amounts of impurities) is particulated to a suitable size, e.g. 200 mesh Tyler series and finer as indicated at 10 and mixed with $Na_2CO_3$ and CaO (the CaO may be initially present as $CaCO_3$) and the mixture is subjected to roasting as indicated at 20. The amount of $Na_2CO_3$ and CaO can be varied in the roast between the limits of 1.4 to 4.2 pounds of $Na_2CO_3$ and 0.6 to 1.0 pounds of CaO per pound of $Cr_2O_3$ in the ore. The preferred amounts of $Na_2CO_3$ and CaO are 1.9 and 0.6 pounds, respectively. The roasting temperature can be varied from 600° C. to 1100° C. and the roasting time can be varied from 0.5 hour to 6.0 hours. The preferred temperature and roasting time is 950° C. for 2 hours. The roasting is conducted in a gaseous oxidizing environment by providing an excess of oxygen by passing, e.g. air, oxygen or a combustion gas with a sufficient excess of oxygen, over the roast bed.

The following equation is representative of the roast reaction using $Na_2CO_3$ to solubilize the chromium:

$$4(Cr_2O_3.FeO) + 8Na_2CO_3 + 7O_2 \rightarrow 2Fe_2O_3 + 8Na_2CrO_4 + 8CO_2 \uparrow$$

The calcines obtained from the roast are conventionally water leached as shown at 30 to substantially solubilize and remove the water soluble chromium salts from the calcines. The leaching can be carried out at temperatures from 5° C. to the boiling point and require a time from 5 minutes to 5 hours depending on the chromium concentration in the leach and the temperature. Bubbling air through the leach liquor increases the amount of chromium extracted from the calcines.

The leach liquor, in addition to the chromium values, contains aluminum and sodium as undesired impurities, e.g. as $NaAlO_2$. The aluminum impurities are removed, as shown at 40 by adding an acid, e.g. $H_2SO_4$, HCl, or $HNO_3$, to the leach liquor until the pH of the liquor is reduced to the range of 3 to 9.5 preferably 8.0. The amount of chromium coprecipitated with the $Al(OH)_3$ at a pH of 8 is typically about 0.6% of the total chromium content in the liquor. However, as the pH is reduced further, the coprecipitation of chromium increases. For economic reasons, $H_2SO_4$ would be a preferred acid for the precipitation of the $Al(OH)_3$ from the leach liquor.

The aluminum left in solution after the $Al(OH)_3$ is filtered off is typically less than 0.7% $Al_2O_3$ based on the weight of equivalent $Cr_2O_3$ in solution.

After removal of the aluminum impurities, the chromium values of the soluble chromium salts in the leach liquor are reduced from valence 6 to 3 by an NaOH and sulfur reduction step as shown at 50 and 70 resulting in the formation of a $Cr(OH)_3$ precipitate. The following equation is representative of the reduction step:

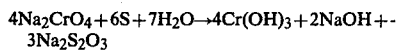

$$4Na_2CrO_4 + 6S + 7H_2O \rightarrow 4Cr(OH)_3 + 2NaOH + 3Na_2S_2O_3$$

In the practice of the present invention, the hereinbefore described leach liquor is prepared and the aluminum impurities removed resulting in a chromium-bearing liquor containing the equivalent of about 5 to 400 grams per liter $Cr_2O_3$ and preferrably the equivalent of about 150 to 200 grams per liter $Cr_2O_3$.

An aqueous slurry of sulfur, NaOH and water is prepared being heated to about the boiling point wherein the range of sulfur is about 34 to 40 parts and the range of NaOH is about 42 to 50 parts per 100 parts of water with 38 parts sulfur and 47 parts NaOH being particularly suitable. While stirring this slurry, chromium-bearing liquor and additional sulfur are introduced therein so as to form a batch which is maintained at about the boiling point and wherein the ratio of the additional sulfur added with the chromium-bearing leach liquor is in the range of about 0.6 to 1 part sulfur per part of $Cr_2O_3$ in the liquor, preferably 0.8 parts sulfur per part of $Cr_2O_3$. The amount of the initial addition of chromium-bearing leach liquor is suitably in the range of about 2.5 to 3 times the volume of slurry and preferably about 2.75.

The batch is continuously stirred and the temperature is maintained at the boiling point. Further additions of chromium-bearing liquor and sulfur are added periodically in quantities preferably equal to the initial addition. The time interval between additions suitably is in the range of about 5–60 minutes, preferably about 15 minutes.

In the preferred practice of the invention, three of these further chromium-bearing liquor and sulfur additions are suitable with the quantities of the additions selected so that the container for the batch is essentially full after the last addition. After the last chromium-bearing leach liquor and sulfur addition, the batch is stirred for about 1 hour at the boiling point.

At this time, in the preferred practice of the present invention, three quarters of the liquid is removed from the batch and filtered as shown at 60 and 80. The residue of the filtration, the chrome hydrate precipitate resulting from the reduction of the chromium values, is water washed in order to remove entrained water soluble impurities from the chrome hydrate precipitate.

To the remaining ¼ volume of the batch, while continually stirring and maintaining the temperature of the batch at the boiling point, chromium-bearing liquor and sulfur additions are made periodically, e.g. 15 minute intervals, as before until the total volume is restored. In the preferred embodiment of the present invention, four equal additions of chromium-bearing liquor and sulfur would be made. Again, after the last addition, the batch is maintained at the boiling point and stirred for about one hour. The filtration and washing step is repeated.

This procedure may be repeated indefinitely. Further additions of NaOH may be required to keep the solution sufficiently alkaline to enable maximum reduction and hence maximum precipitation of the chromium values.

After the last iteration of the preferred procedure, the entire batch is filtered.

To those skilled in the art, it is apparent that this procedure may be adapted to continuous operation.

For two iterations, the total amount of sulfur used will be in the range of about 0.8 to 1.2 parts sulfur per part of $Cr_2O_3$ added with the chromium-bearing liquor, preferably about 0.8 parts sulfur, and the total amount of NaOH used will be in the range of about 0.2 to 0.4 parts NaOH per part $Cr_2O_3$, preferrably about 0.25 parts NaOH. As the number of iterations increase, the amount of sulfur added will approach about 0.6 to 1.0, preferably about 0.8, parts sulfur per part $Cr_2O_3$ added with the chromium-bearing liquor.

In this reduction procedure, the rate of addition of chromium-bearing liquor to the batch is not critical.

In the foregoing reduction procedure, the recovery of chromium values from the leach liquor is about 99.9%.

The chrome hydrate precipitate of the foregoing reduction step may be water washed or repulped in water and recovered by filtration as many times as required to remove entrained water soluble impurities to a desired level. In many applications, one water wash of the chrome hydrate precipitate and one water repulp of the chrome hydrate precipitate followed by recovery of the precipitate by filtration would be adequate.

The chrome hydrate precipitate recovered at this stage of the method of the present invention may be of satisfactory purity for the end use of the product desired by one skilled in the art, e.g. uses where a low sodium and low sulfur content chrome hydrate is not required. In this instance, the further steps of the method of the present invention as hereinafter described would not be practiced.

Sodium and cation impurities are next removed from the water washed chrome hydrate residue of the reduction step by an acid repulp step as shown at 90. The wet chrome hydrate residue is repulped in an $H_2SO_4$ solution at a pH of about 2 to 5 and preferably 3 at ambient temperature (i.e. suitably about 25° C. with a temperature range of about 5° C. to 90° C. being operable) and stirred for about one hour. Acids such as HCl and $HNO_3$ would be suitable for this repulp step but $H_2SO_4$ is preferable because of economy.

The mixture is then filtered and the residue of the filtration, chrome hydrate, is water washed.

The foregoing acid repulp step reduces the sodium impurities to less than 0.03 percent based on $Cr_2O_3$ and less than 0.1 percent of the chromium values are lost during the procedure.

The chrome hydrate recovered at this stage of the method of the present invention is essentially free of all impurities with the exception of sulfur and would be satisfactory for uses such as feed for an electrolytic chromium cell. When such a product is desired by one skilled in the art, the further steps of the method of the present invention as hereinafter described would not be practiced.

The chrome hydrate residue can be oven dried, as shown at 100, at a temperature of about 25° C. to 98° C. and preferably about 98° C. to remove entrained moisture and to provide an acid soluble chrome hydrate in which impurities other than sulfur are minimal.

Drying at temperatures greater than 98° C. for short periods of time is possible but should be avoided since the chrome hydrate may dehydrate and become acid insoluble. However, if one skilled in the art desires to obtain a $Cr_2O_3$ produce in which sulfur impurities are removed by calcining the chrome hydrate, as hereinafter described in accordance with the method of the present invention, the temperature for drying the chrome hydrate is not critical since the dehydrating of the chrome hydrate would not effect the subsequently described calcining step.

Sulfur impurities are next removed from the oven dried chrome hydrate by calcining at a temperature of about 750° C. to 2200° C. as shown at 110. The length of time of the calcining would depend on the temperature and the desired sulfur content remaining after calcining. For example sulfur contents of less than 0.01% based on $Cr_2O_3$ may be achieved by calcining at 1200° C. for 60 minutes. Thus, an essentially pure metallurgical grade $Cr_2O_3$, as shown at 120, may be obtained by the practice of the foregoing process.

In the practice of the present invention, certain by-products may be produced. For example, $Na_2S_2O_3$ may be recovered from the filtrate of the reduction step.

Those skilled in the art may practice the NaOH and sulfur reduction step and subsequent steps of the present invention on aqueous solutions of $Na_2CrO_4$ and $Na_2Cr_2O_7$ prepared by dissolving a commercial grade $Na_2CrO_4$ or $Na_2Cr_2O_7$ in water.

An example of the method of the present invention is as follows:

EXAMPLE

Transvaal chromium ore having the analysis shown below was ground to 100% finer than 200 mesh (Tyler).

| CHROMIUM ORE ANALYSIS (Reported As Oxides) | |
| --- | --- |
| $Cr_2O_3$ | 44.6% |
| Total $Fe_2O_3$ | 27.5% |
| $SiO_2$ | 3.5% |
| CaO | 0.4% |
| $Al_2O_3$ | 26.9% |
| $Na_2O$ | <0.1% |
| MgO | 10.1% |

A large batch of chrome leach liquor was obtained by roasting 26 portions of Transvaal chromium ore using 75.0 g. ore, 62.1 g. commercial grade $Na_2CO_3$, and 18.8 g. reagent grade CaO in each portion. The roasts were made in a muffle furnace set at 950° C. with a 2-hour retention time in an Inconel X tray with moist air flowing over the sample at 4 liter/minute. The calcines were air cooled, pulverized, and leached with water using a countercurrent flow. Twelve (12) molar HCl was introduced into the leach liquor to reduce the pH to 8.0 with the resulting precipitation of aluminum as $Al(OH)_3$. After removal of the aluminum by filtration, the leach liquor contained 181 g/l $Cr_2O_3$. In the roast-leach-aluminum removal steps 90% of the chromium values from the Transvaal ore were recovered in the acidified leach liquor. The material balance was 98%. This liquor will be referred to as solution A.

A reducing slurry was prepared by mixing 47 grams of reagent grade NaOH and 38 grams of commercial grade sulfur with 100 ml. of water and boiling and stirring the slurry for 1 hour. While maintaining the slurry at the boiling point (105° C.) and continuing stirring, 132 ml. of solution A and 20 grams of commercial grade sulfur were introduced into the slurry. Heating to the boiling point and stirring were continued and the temperature rose to 108° C. The addition of 132 ml. of solution A and 20 grams of commercial grade sulfur was repeated three times at about 15 minute intervals. The total mixture was stirred for about 1 hour at the boiling point (108°–110° C.).

At this time ¾ of the volume of the mixture was removed and poured into an 8 inch Buchner funnel using No. 41 Whatman paper and was filtered. The time required for filtration was about 3 minutes, thus demonstrating a rapid filtration occurs. The residue of the filtration, chrome hydrate having the appearance of a green cake, was water washed with 250 ml. of water at room temperature.

The total filtrate and wash measured 458 ml. and contained 0.03 g/l $Cr_2O_3$. Thus only 0.06% of the $Cr_2O_3$ was lost in the filtration and wash.

To the remaining ¼ volume of the mixture being stirred and heated to the boiling point, 132 ml. of solution A and 20 grams of commercial grade sulfur were introduced as before. The addition of 132 ml. of solution A and 20 grams of commercial grade sulfur was repeated three more times at approximately 15 minute intervals, thus being an iteration of the previously described procedure. No further addition of NaOH was made. After the last addition of solution A and sulfur, the mixture was again stirred and maintained at the boiling point (108° C.) for about 1 hour. The entire mixture was then poured into an 8 inch Buchner funnel using No. 41 Whatman paper and filtered as before. The time of filtration was about 4 minutes. The residue of the filtration, chrome hydrate, was water washed with 400 ml. of water at room temperature.

A sample of the wet residue of the filtration was dried overnight at 98° C. and found to contain 41.4% moisture. The dried sample contained by analysis 59.3% $Cr_2O_3$ and 9.12% Na. The total filtrate and wash from this second iteration measured 515 ml. and contained 0.03 g/l $Cr_2O_3$. Thus, a $Cr_2O_3$ recovery of approximately 99.9% was made in the entire reduction step.

The foregoing demonstrates that the reduction step of the present invention may be adapted to continuous or semi-continuous applications by those skilled in the art. Furthermore, one skilled in the art may use the chrome hydrate product resulting from the reduction step if a low sodium and sulfur content chrome hydrate product is not required for the intended use of the chrome hydrate product.

Sodium and cation impurities were next removed from the Cr(OH)$_3$ residue produced by the preceding reduction procedure by acid repulp. To 371 grams of wet chrome hydrate (approximately 129 grams Cr$_2$O$_3$) was added 3000 ml. of water and the mixture was stirred for about 1 hour at room temperature. The mixture was filtered in an 8 inch Buchner funnel using No. 41 Whatman paper. Time of filtration was 16 minutes. The residue was then washed with 400 ml. of water at room temperature. The combined filtrate and wash (3410 ml. at 0.03 g/l Cr$_2$O$_3$) contained 0.08% of the Cr$_2$O$_3$ in the wet chrome hydrate prior to the wash. Now to the wet water washed chrome hydrate was added 250 ml. of water at room temperature and the mixture was stirred to remove any lumps. The pH of this mixture was 12.0. To this mixture was added 270 ml. of 1.75 molar H$_2$SO$_4$ (171 g/l H$_2$SO$_4$) to bring the pH to 3.0. The mixture was stirred for 1 hour at room temperature. The mixture was then filtered in an 8 inch Buchner funnel using No. 41 Whatman paper. The time of filtration was 17 minutes. The residue of filtration was then washed with 400 ml. of water at room temperature.

The combined filtrate and wash (3170 ml. at 0.005 g/l Cr$_2$O$_3$) contained 0.012% of the Cr$_2$O$_3$ in the original chrome hydrate sample. Thus, a total of only approximately 0.092% of the Cr$_2$O$_3$ was lost in the sodium removal procedure.

After the H$_2$SO$_4$ treatment, the wet chrome hydrate residue was oven dried at 98° C. overnight. The oven dried material had the following analysis for the indicated materials:

| | | |
|---|---|---|
| Cr$_2$O$_3$ | 60.15% | (by chem. anal.) |
| Na | 0.016% | (by chem. anal.) |
| Al | 0.1–1.0% | (by spec. anal.) |
| Si | 0.01–0.1% | (by spec. anal.) |
| S | 5.2% | (by chem. anal.) |

No other metallic elements were detected in significant quantities. Thus the above analysis shows the presence of only about 0.03% sodium based on the Cr$_2$O$_3$ content and an approximate sulfur content of 9% sulfur based on the Cr$_2$O$_3$ content.

The foregoing demonstrates that after the acid repulp step, a wet chrome hydrate product is obtained with negligible impurities other than sulfur. For some applications (e.g., feed for producing electrolytic chromium) those skilled in the art may not require a low sulfur content and thus the chrome hydrate product resulting from the acid repulp step may be used.

In order to remove the sulfur impurities, some oven dried chrome hydrate (5 grams) was calcined in a muffle furnace at 1200° C. for about 60 minutes producing Cr$_2$O$_3$. The sulfur content was found to be 0.009% based on the weight of Cr$_2$O$_3$ after the calcining. Thus a metallurgical grade Cr$_2$O$_3$ essentially free of undesirable impurities has been obtained.

If such low sulfur contents in the Cr$_2$O$_3$ are not required, it has been found that varying the time and temperature of the calcining step will result in different sulfur contents in the end product. For example, calcining the oven dried chrome hydrate for 15 minutes at 1200° C. reduced the sulfur content from approximately 9% to 0.042%. Calcining for 60 minutes at 750° C. reduced the sulfur content to 0.76%. Calcining for 15 minutes at 750° C. reduced the sulfur content to 0.82%. Thus by controlling the time and temperature of the calcining, a Cr$_2$O$_3$ product with a desired sulfur content can be obtained.

In the foregoing example approximately 0.8 pounds of sulfur and 0.44 pounds of H$_2$SO$_4$ and 0.025 pounds NaOH were used per pound of Cr$_2$O$_3$ produced.

The foregoing demonstrates that the method of the present invention results in the recovery of approximately 90 percent of the chromium values from a natural chromium ore such as Transvaal ore, Nye ore and other oxidic chromium bearing materials in the form of pure Cr$_2$O$_3$ (less than about 0.5% aluminum, 0.03% sodium and 0.009% sulfur based on the weight of Cr$_2$O$_3$).

What is claimed is:

1. A method for recovering chrome hydrate from chromium ore which comprises:
   (i) roasting in a gaseous oxidizing environment a mixture of chromium ore with Na$_2$CO$_3$ and CaO at a temperature in the range of about 600° C. to 1100° C. for from about 0.5 to 6 hours, the amount of Na$_2$CO$_3$ being that which provides from about 1.4 to 4.2 pounds of Na$_2$CO$_3$ per pound of Cr$_2$O$_3$ in the ore and the amount of CaO being that which provides from about 0.6 to 1 pound of CaO per pound of Cr$_2$O$_3$ in the ore;
   (ii) water leaching the roasted material obtained in step (i) at a temperature of from about 5° C. to the boiling point of water for from about 5 minutes to 5 hours;
   (iii) adding an acid to the leach liquor obtained in step (ii) to provide a pH of from about 3 to 9.5 to cause precipitation of aluminum impurities and separating said impurities from the leach liquor;
   (iv) contacting the liquor obtained in step (iii) with an aqueous slurry of NaOH and elemental sulfur at about the boiling point and additional elemental sulfur with the NaOH and elemental sulfur slurry and the additional elemental sulfur being in an amount sufficient to effect the reduction of the chromium values in the contacted liquor from a valence of 6 to 3 forming a chrome hydrate precipitate with said contacted liquor being maintained at about the boiling point during the reduction;
   (v) recovering the chrome hydrate precipitate of step (iv) by filtration;
   (vi) washing the recovered chrome hydrate of step (v) with water to remove entrained soluble impurities.

2. A method in accordance with claim 1 wherein the roasting temperature of step (i) is about 950° C. and the roasting time is about 2 hours.

3. A method in accordance with claim 1 wherein in step (i) an aggregate of about 1.9 pounds of Na$_2$CO$_3$ and 0.6 pound of CaO are used per pound of Cr$_2$O$_3$ in the ore.

4. A method in accordance with claim 1 wherein the pH provided in step (iii) is about 8.

5. A method in accordance with claim 1 wherein the acid of step (iii) is selected from the group consisting of H$_2$SO$_4$, HCl and HNO$_3$.

6. A method in accordance with claim 1 wherein the acid of step (iii) is H$_2$SO$_4$.

7. A method in accordance with claim 1 wherein in step (ii) air is bubbled through the water leaching liquid during the leaching step to increase the recovery of chromium values.

8. A method for recovering chrome hydrate from chromium ore which comprises:
   (i) roasting in a gaseous oxidizing environment a mixture of chromium ore with $Na_2CO_3$ and CaO at a temperature in the range of about 600° C. to 1100° C. for from about 0.5 to 6 hours, the amount of $Na_2CO_3$ being that which provides from about 1.4 to 4.2 pounds of $Na_2CO_3$ per pound of $Cr_2O_3$ in the ore and the amount of CaO being that which provides from about 0.6 to 1 pound of CaO per pound of $Cr_2O_3$ in the ore;
   (ii) water leaching the roasted material obtained in step (i) at a temperature of from about 5° C. to the boiling point of water for from about 5 minutes to 5 hours;
   (iii) adding an acid to the leach liquor obtained in step (ii) to provide a pH of from about 3 to 9.5 to cause precipitation of aluminum impurities and separating said impurities from the leach liquor;
   (iv) contacting the liquor obtained in step (iii) with an aqueous slurry of NaOH and elemental sulfur at about the boiling point and additional elemental sulfur with the NaOH and elemental sulfur slurry and the additional elemental sulfur being in an amount sufficient to effect the reduction of the chromium values in the contacted liquor from a valence of 6 to 3 forming a chrome hydrate precipitate with said contacted liquor being maintained at about the boiling point during the reduction;
   (v) recovering the chrome hydrate precipitate of step (iv) by filtration;
   (vi) washing the recovered chrome hydrate of step (v) with water to remove entrained soluble impurities;
   (vii) repulping the chrome hydrate of step (vi) in an $H_2SO_4$ solution at ambient temperature having a pH of about 2 to 5 followed by filtration to recover the chrome hydrate and water washing of the recovered chrome hydrate so that sodium and cation impurities are removed.

9. A method in accordance with claim 8 wherein the roasting temperature of step (1) is about 950° C. and the roasting time is about 2 hours.

10. A method in accordance with claim 8 wherein in step (i) an aggregate of about 1.9 pounds of $Na_2CO_3$ and 0.6 pound of CaO are used per pound of $Cr_2O_3$ in the ore.

11. A method in accordance with claim 8 wherein the pH provided in step (iii) is about 8.

12. A method in accordance with claim 8 wherein the acid of step (iii) is selected from the group consisting of $H_2SO_4$, HCl and $NHO_3$.

13. A method in accordance with claim 8 wherein the acid of step (iii) is $H_2SO_4$.

14. A method in accordance with claim 8 wherein in step (ii) air is bubbled through the water leaching liquid during the leaching step to increase the recovery of chromium values.

15. A method in accordance with claim 8 wherein the recovered water washed chrome hydrate of step (vii) is dried at a temperature of about 25° C. to 98° C. to remove entrained moisture and to provide an acid soluble chrome hydrate.

16. A method in accordance with claim 15 wherein the temperature is about 98° C.

17. A method for recovering high purity $Cr_2O_3$ from chromium ore which comprises:
   (i) roasting in a gaseous oxidizing environment a mixture of chromium ore with $Na_2CO_3$ and CaO at a temperature in the range of about 600° C. to 1100° C. for from about 0.5 to 6 hours, the amount of $Na_2CO_3$ being that which provides from about 1.4 to 4.2 pounds of $Na_2CO_3$ per pound of $Cr_2O_3$ in the ore and the amount of CaO being that which provides from about 0.6 to 1 pound of CaO per pound of $Cr_2O_3$ in the ore;
   (ii) water leaching the roasted material obtained in step (i) at a temperature of from about 5° C. to the boiling point of water for from about 5 minutes to 5 hours;
   (iii) adding an acid to the leach liquor obtained in step (ii) to provide a pH of from about 3 to 9.5 to cause precipitation of aluminum impurities and separating said impurities from the leach liquor;
   (iv) contacting the liquor obtained in step (iii) with an aqueous slurry of NaOH and elemental sulfur at about the boiling point and additional elemental sulfur with the NaOH and elemental sulfur slurry and the additional elemental sulfur being in an amount sufficient to effect the reduction of chromium values in the contacted liquor from a valence of 6 to 3 forming a chrome hydrate precipitate with said contacted liquor being maintained at about the boiling point during the reduction;
   (v) recovering the chrome hydrate precipitate of step (iv) by filtration;
   (vi) washing the recovered chrome hydrate of step (v) with water to remove entrained soluble materials;
   (vii) repulping the chrome hydrate of step (vi) in an $H_2SO_4$ solution at ambient temperature havng a pH of about 2 to 5 followed by filtration to recover the chrome hydrate and water washing of the recovered chrome hydrate so that sodium and cation impurities are removed;
   (viii) drying the chrome hydrate of step (vii) to provide a solid chromium-bearing material;
   (ix) calcining the solid chromium-bearing material of step (viii) at a temperature of about 750° C. to about 2200° C. to obtain $Cr_2O_3$ with said calcining being continued for a time sufficient to lower sulfur impurities to a desired level.

18. A method in accordance with claim 17 wherein the roasting temperature of step (i) is about 950° C. and the roasting time is about 2 hours.

19. A method in accordance with claim 17 wherein in step (i) an aggregate of about 1.9 pounds of $Na_2CO_3$ and 0.6 pound of CaO are used per pound of $Cr_2O_3$ in the ore.

20. A method in accordance with claim 17 wherein the pH provided in step (iii) is about 8.

21. A method in accordance with claim 17 wherein the acid of step (iii) is selected from the group consisting of $H_2SO_4$, HCl and $HNO_3$.

22. A method in accordance with claim 17 wherein the acid of step (iii) is $H_2SO_4$.

23. A method in accordance with claim 17 wherein in step (ii) air is bubbled through the water leaching liquid during the leaching step to increase the recovery of chromium values.

24. A method in accordance with claim 17 wherein in step (ix) the temperature is about 1200° C. and the time of calcining is about 60 minutes.

* * * * *